United States Patent [19]

Ogawa et al.

[11] Patent Number: 5,827,382

[45] Date of Patent: Oct. 27, 1998

[54] METHOD OF MANUFACTURING A MULTILAYER CAPACITOR

[75] Inventors: Mamoru Ogawa, Fukui; Takashi Yoshikawa, Sabae, both of Japan

[73] Assignee: Murata Manufacturing Co., Ltd., Kyoto, Japan

[21] Appl. No.: 675,600

[22] Filed: Jul. 3, 1996

[30] Foreign Application Priority Data

Jul. 5, 1995 [JP] Japan .................... 7-194222

[51] Int. Cl.$^6$ .................... B32B 31/00
[52] U.S. Cl. .................... 156/64; 156/89; 29/25.42
[58] Field of Search .................... 156/64, 89; 29/25.41, 29/25.42; 361/301.1, 306.3, 321.2

[56] References Cited

U.S. PATENT DOCUMENTS

| | | | |
|---|---|---|---|
| 4,347,650 | 9/1982 | McLarney et al. | 29/25.42 |
| 4,443,278 | 4/1984 | Zingher | 156/64 |
| 4,665,465 | 5/1987 | Tanabe | 361/306.3 |
| 5,231,558 | 7/1993 | Tatsuta | 361/321.2 |
| 5,316,602 | 5/1994 | Kogame et al. | 156/64 |
| 5,417,784 | 5/1995 | Kobayashi et al. | 156/64 |
| 5,440,794 | 8/1995 | Kaeriyama et al. | 29/25.42 |
| 5,505,809 | 4/1996 | Yamamoto et al. | 156/264 |

FOREIGN PATENT DOCUMENTS

| | | | |
|---|---|---|---|
| 3-131008 | 6/1991 | Japan | 361/321.2 |
| 9022830 | 3/1997 | Japan . | |

*Primary Examiner*—David A. Simmons
*Assistant Examiner*—Paul M. Rivard
*Attorney, Agent, or Firm*—Ostrolenk, Faber, Gerb & Soffen, LLP

[57] ABSTRACT

According to a method of manufacturing a multilayer capacitor, the accuracy of the capacitance of the capacitor is improved. After internal electrodes 2 are printed on ceramic green sheets 1, the area of the internal electrodes on all of the ceramic green sheets is measured on a block-by-block basis. The number of the green sheets having main patterns provided thereon to be stacked to obtain a set capacitance for the capacitor is obtained from the area of the electrodes. A predetermined number of sheets are stacked to create a block. Thus, the accuracy of the capacitance of the multi-layer capacitors is improved.

21 Claims, 3 Drawing Sheets

METHOD OF MANUFACTURING A MULTILAYER CAPACITOR

BACKGROUND OF THE INVENTION

1. Field of the Invention

The present invention relates to a method of manufacturing a multilayer capacitor having a number of green sheets stacked with internal electrodes provided thereon and, more particularly, to a manufacturing method which can improve the accuracy of the capacitance of such a capacitor.

2. Description of the Related Art

The manufacture of multilayer capacitors is generally carried out by employing a method wherein, as shown in FIG. 4 (which shows an embodiment of the invention), internal electrodes 2 are printed and dried on the surface of ceramic green sheets 1; thereafter, the green sheets 1 are stacked in a quantity corresponding to the capacitance to be obtained, with, if necessary, a green sheet having a correction pattern 3 provided thereon; heating and firing is performed; and external electrodes 4 are provided on both ends of the product.

The capacitance obtained in such multilayer capacitors, and variations of the same, are primarily determined by the electrode area occupied by the internal electrodes 2 after they are printed and dried on the ceramic green sheets 1.

During the manufacture of a multilayer ceramic capacitor, the number of green sheets having internal electrodes thereon to be stacked to obtain a given capacitance has conventionally been determined by sampling the sheets in a production lot after the internal electrodes are printed and dried on a mother green sheet, to obtain a representative value of the area of a printed internal electrode, and by thereafter determining the number of green sheets to be stacked having internal electrodes 2 provided thereon and the area of an electrode 3 to be provided on a correction pattern.

However, the area of the internal electrodes depends on the degree of the expansion and contraction of the ceramic sheets. Specifically, the degree of the expansion and contraction of the ceramic sheets varies depending on the water content of the ceramic sheets and external forces applied during the storage of the sheets, which causes variations in the area of the internal electrodes. This has resulted in a problem in that it is difficult to control the capacitance accurately on a production lot basis by setting and correcting the number of sheets to be stacked using a representative value of such an area.

Especially, in light of a recent trend toward more compact and higher precision multilayer ceramic capacitors, a change in capacitance due to the accumulation of errors in the area of the internal electrodes results in a problem in the case of capacitors that must have high precision in that the yield of the products is decreased.

Further, the method of determining the number of green sheets to be stacked from a representative value of the area of an internal electrode obtained by performing sampling on a production lot has resulted in a problem, especially in the case of a large production lot, in that the sampling can not be finished until all of the internal electrodes in the lot are printed and dried, which increases the amount of work in process.

It is therefore an object of the present invention to provide a method of manufacturing multilayer capacitors wherein the accuracy of the capacitance and the yield of the products can be improved, by obtaining the number of green sheets to be stacked having internal electrodes provided thereon, and a correction amount for a correction pattern, on a block-by-block basis, from the area of the electrodes obtained by measuring block-by-block all or a plurality of the electrodes, after they are printed and dried.

SUMMARY OF THE INVENTION

In order to solve the problems as described above, according to a first aspect of the invention, a method is employed wherein after internal electrodes are printed and dried on green sheets, the area of the electrodes is obtained by sampling all of the sheets or a part of each sheet or one sheet from among several sheets on a block-by-block basis, i.e., by sampling a limited number of sheets which are to be included in a block, and wherein the number of the green sheets having the internal electrodes provided thereon which are to be stacked in a block to obtain a multilayer capacitor with a given capacitance is obtained from the area of the electrodes on each sheet thus obtained for that block.

According to a second aspect of the present invention, a method is employed wherein after internal electrodes are printed and dried on green sheets, the area of the electrodes on all the sheets is obtained on a block-by-block basis; the number of the green sheets having the internal electrodes provided thereon to be stacked to obtain a set capacitance of a multilayer capacitor, and the area or a shifting amount of an electrode on an internal electrode for correction, are determined from the area of the electrodes on each sheet; and the green sheets having the internal electrodes provided thereon and a green sheet having the internal electrode for correction thereon are stacked to form a block.

The area of the internal electrodes on all of the ceramic green sheets is obtained on a block-by-block basis after the internal electrodes are printed and dried on the ceramic green sheets. The number of the sheets formed with internal electrodes to be stacked and the electrode area or shifting amount of the internal electrode for correction are obtained for each block based on the area of the electrodes on each sheet. The sheet provided with internal electrodes for correction is stacked on the sheets provided with the internal electrodes provided thereon to create a block. This makes it possible to provide capacitors with a highly accurate capacitance, thereby improving the yield of the products.

Further, production efficiency is improved because the printing and drying of the internal electrodes, the measurement of the area of the internal electrode, and the creation of blocks can be carried out continuously.

DETAILED DESCRIPTION OF A PREFERRED EMBODIMENT

An embodiment of the present invention will now be described with reference to the drawings.

Figure 1:
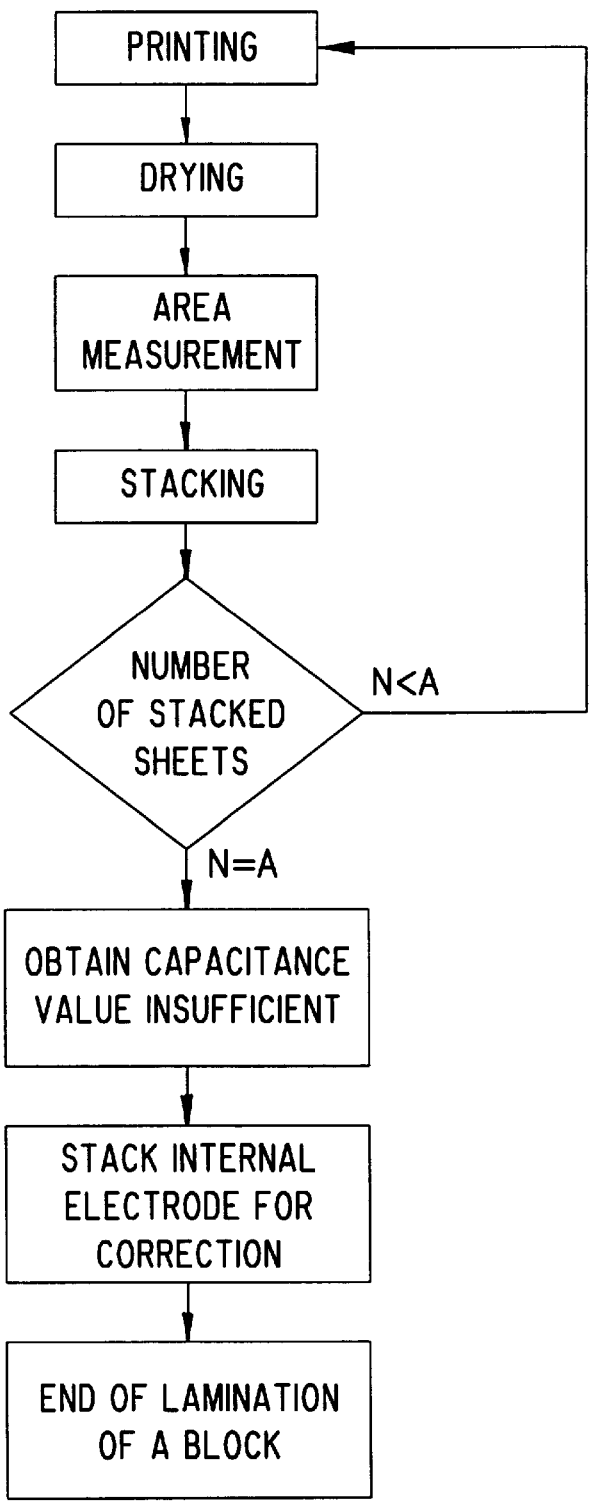
FIG. 1 is a flow chart showing processing steps according to an embodiment of the present invention.

FIG. 1 is a flow chart showing processing steps according to a manufacturing method according to the present invention. After internal electrodes are printed and dried on the surface of ceramic green sheets, the areas of the electrodes on all of the ceramic green sheets are determined. A predetermined number of green sheets are stacked and laminated to form a block, and the lamination of a block is terminated when a predetermined capacitance is obtained by this number of stacked sheets.

When the capacitance obtained by the above-mentioned number of sheets is insufficient, the area of an internal electrode for correction which must be added to the block is obtained on the basis of the insufficient capacitance value; and green sheets having such an internal electrode for correction provided thereon are stacked overlapping the internal electrodes to terminate the lamination of a block.

Figure 4:
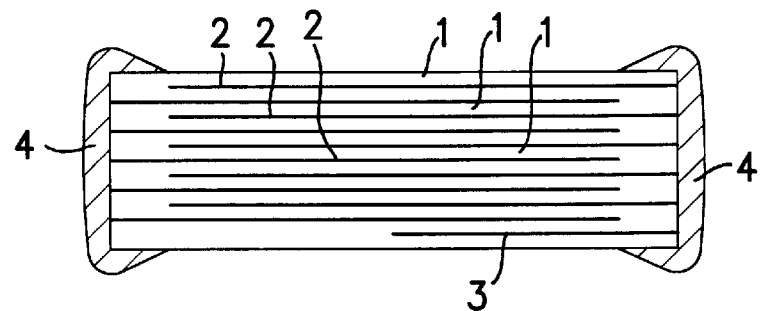
FIG. 4 is a sectional view of a multilayer capacitor obtained by the method.

As shown in FIG. 4, according to the manufacturing method including the above-described processing steps, a multilayer ceramic capacitor is provided by stacking ceramic green sheets 1 having internal electrodes 2 printed thereon in a quantity corresponding to a given capacitance, stacking a ceramic green sheet having an internal electrode for correction 3 printed thereon, and heating and firing the same.

FIGS. 2(A) through 2(D) show different examples of a method of directly measuring the areas of internal electrodes 2 printed and dried on a ceramic green sheet.

Figure 2A:
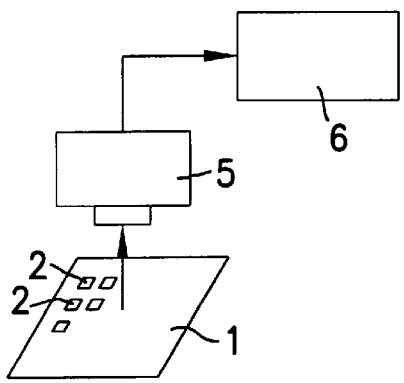
FIGS. 2(A), 2(B), 2(C), and 2(D) illustrate different examples of an area measuring method.

FIG. 2(A) shows a method of measuring area wherein the internal electrode is photographed with a CCD or an optical camera 5 and the resultant image is analyzed by a processor 6.

Figure 2B:
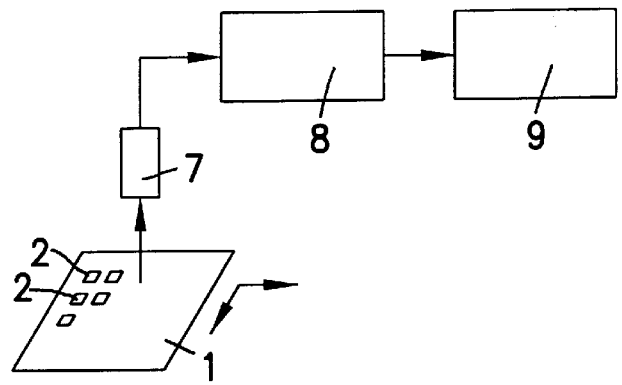

FIG. 2(B) shows a method wherein an optical device 7 scans a sheet two-dimensionally and measurement is performed using an A-D converter 8 and a processor 9.

Figure 2C:
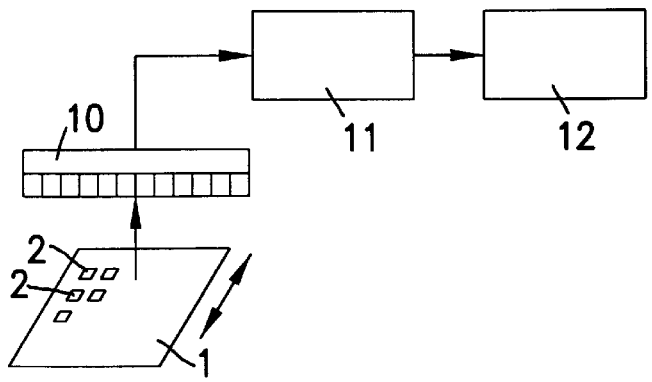

FIG. 2(C) shows a method wherein an optical device array 10 scans a sheet one-dimensionally and measurement is performed using an A-D converter 11 and a processor 12.

In each of the above measuring methods, there need not be only one camera 5, optical device 7, or optical device array 10, but rather the measurement may be performed using a plurality of such components.

Figure 2D:
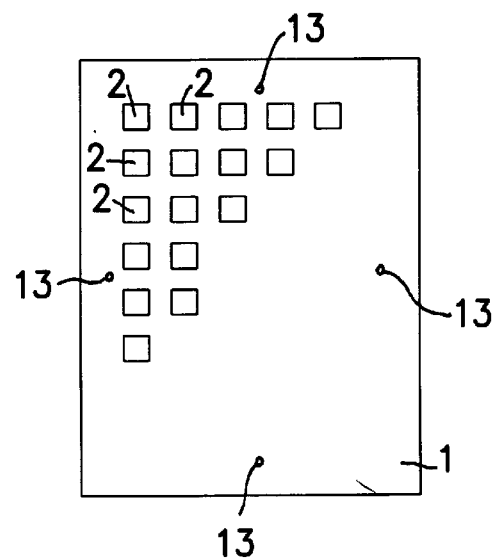

FIG. 2(D) shows a method wherein sensing marks 13 are provided at two or more points on the ceramic green sheet 1 simultaneously with the printing of the internal electrodes; the distance between the marks 13 is measured using the methods shown in FIGS. 2(A) through 2(C); and the expansion and contraction of the ceramic green sheet 1 is calculated from the measured value to obtain the areas of the internal electrodes indirectly.

Methods of correcting the areas of internal electrodes include (1) a method wherein a correction process is performed on the area of the opening for the electrode in the printing pattern for the internal electrode and (2) a method wherein a correction process is performed on the area of the electrode formed on the sheet immediately after the printing of the internal electrode, wherein data representative of the area has been separately maintained.

Another method is to obtain the outside dimensions of the ceramic green sheet optically or physically and to determine the expansion and contraction of the sheet by comparing such values obtained before and after drying, thereby obtaining the areas of the internal electrodes indirectly.

Figure 3A:
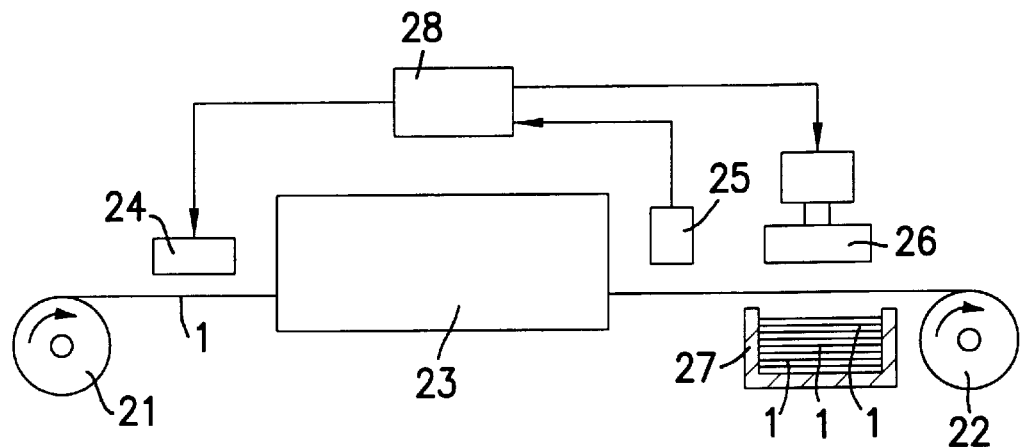
FIG. 3(A) is a front view of an apparatus in which the present invention is implemented.

FIG. 3(A) illustrates an apparatus wherein the manufacturing method according to the present invention is implemented. A dryer 23 for heating and drying a ceramic green sheet 1 passing therethrough is provided in the middle of the path traveled by the sheet 1 which is pulled out from a reel 21 and taken up by a take-up reel 22. A printing head 24 for printing internal electrodes is provided in a position upstream of the dryer 23. An area measuring machine 25; a machine 26 for shift-punching and stacking the sheet 1; and a metal mold 27 provided opposite to the stacking machine 26 across the sheet 1 for receiving the punched sheets 1 in a stacked state, are provided downstream from the dryer.

The result of the measurement performed by the area measuring machine 25 on the internal electrode is inputted to a processor 28 which in turn activates the printing head 24 and shift-punching and stacking machine 26 to print the internal electrodes on the ceramic sheets 1 and to stack the sheets 1 by punching them automatically.

Further, an internal electrode for correction can be formed by changing the printing position of the printing head 24 which was used to form the internal electrodes, or by shifting the punching position of the stacking machine 26. That is, an internal electrode for correction can be the same as an internal electrode, but in a shifted position.

Figure 3B:
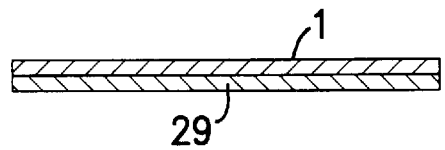
FIG. 3(B) is a sectional view of a ceramic green sheet.

As shown in FIG. 3(B), the ceramic green sheet 1 is formed on a synthetic resin film 29 to a predetermined thickness.

The method of manufacturing a multilayer capacitor will now be described with reference to FIG. 3(A).

The internal electrodes 2 are printed by the printing head 24 on the ceramic green sheet 1 pulled out from the reel 21 before it enters the dryer 23, and the internal electrodes are dried as the sheet 1 passes through the dryer 23 thereafter.

The ceramic green sheet 1 contracts as a result of the drying after the printing of the internal electrode, which results in a change in the area of the internal electrodes from a value at the time of the printing to a value after the drying.

When the ceramic green sheet 1 exits the dryer 23, the area of the internal electrodes is sequentially measured by the area measuring machine 25 and is inputted to the processor 28. A capacitance to be obtained for a capacitor is inputted in the processor in advance, and the processor performs integration each time an area of an internal electrode is inputted to calculate the number of layers and operates the stacking machine 26 to punch the sheets and to stack them up in the metal mold 27.

The area of the internal electrodes is sequentially measured by the area measuring machine 25, and the punching by the stacking machine 26 is repeated until the number of the sheets to be stacked, which is obtained from the cumulative area, reaches the capacitance to be obtained, so that the sheets are stacked in the metal mold 27 in a quantity corresponding to the capacitance to be obtained.

In this case, the stacking may be performed by obtaining the area of the electrodes on all sheets or may alternatively be performed based on the area of electrodes obtained by carrying out sampling on the electrodes or sheets at a frequency of about 10% or more.

Further, if it is required to perform fine tuning of the capacitance to be obtained, a sheet provided with an internal electrode for correction is created by obtaining a shifting amount for the correction sheet to shift the position for sheet punching by the stacking machine 26, and the sheet provided with the internal electrode for correction is stacked on the green sheets having the internal electrodes provided thereon. In this case, the shape of the internal electrode is the same as that of the internal electrode for correction.

A block is created by stacking up the green sheets having main patterns provided thereon and the green sheet having a correction pattern provided thereon as described above and is integrated into a multilayer structure which is in turn cut and fired and is provided with external electrodes to provide a multilayer capacitor having a capacitance which agrees with the target capacitance.

As described above, according to the present invention, the area of all or a plurality of the internal electrodes is obtained to determine the number of green sheets having the internal electrodes thereon to be stacked to obtain a set capacitance of a multilayer capacitor. This eliminates factors which can cause variation in capacitance due to variation in the area of the internal electrodes and therefore allows the accuracy of capacitance and the yield of the products to be improved.

In addition, since the processes from the printing of the internal electrodes on the green sheets through the creation of a block can be continuously performed, the efficiency of the manufacture of capacitors can be improved.

While a particular embodiment of the present invention has been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of manufacturing a multilayer capacitor with a predetermined capacitance by stacking in a block green sheets each having an electrode on a side thereof, comprising, prior to stacking said green sheets, the steps of:

measuring the areas of said electrodes by sampling after the electrodes are printed and dried on the green sheets; and then determining the number of said green sheets to be stacked to obtain said predetermined capacitance, on the basis of the areas of the electrodes thus measured.

2. A method as in claim 1, wherein said sampling is carried out on all the sheets of at least one block.

3. A method as in claim 1, wherein said sampling is carried out on a part of each sheet of at least one block.

4. A method as in claim 3, wherein at least 10 percent of each sheet is sampled.

5. A method as in claim 1, wherein said sampling is carried out on at least one sheet selected from among several sheets of at least one block.

6. A method as in claim 5, wherein at least 10 percent of said sheets are sampled.

7. A method as in claim 1, further comprising the step of stacking said number of green sheets having the internal electrodes provided thereon.

8. A method as in claim 7, wherein said number is determined by sequentially integrating the electrode areas thus measured until said predetermined capacitance is reached in the green sheets thus stacked.

9. A method as in claim 1, wherein said area is measured by a method selected from the group consisting of direct and indirect methods.

10. A method of manufacturing a multilayer capacitor with a predetermined capacitance by stacking in a block green sheets each having an electrode on a side thereof, comprising the steps of:

measuring the areas of said electrodes on all of the green sheets after the electrodes are printed and dried on the green sheets; then determining the number of said green sheets to be stacked to obtain said predetermined capacitance, and a characteristic of a correction electrode on a green sheet having an internal electrode for correction, on the basis of the measured electrode areas on said green sheets; and then stacking the green sheets having the electrodes provided thereon and the green sheet having the internal electrode for correction thereon.

11. A method as in claim 10, wherein said area is measured by sampling all of the sheets of at least one block.

12. A method as in claim 10, wherein said area is measured by sampling a part of each sheet of at least one block.

13. A method as in claim 12, wherein at least 10 percent of each sheet is sampled.

14. A method as in claim 10, wherein said area is measured by sampling at least one sheet selected from among several sheets of at least one block.

15. A method as in claim 14, wherein at least 10 percent of said sheets are sampled.

16. A method as in claim 10, wherein the area of a correction electrode is determined in said determining step.

17. A method as in claim 10, wherein a shifting amount of a correction electrode is determined in said determining step.

18. A method as in claim 10, wherein said number is determined by sequentially integrating the electrode areas thus measured until said predetermined capacitance is reached in the green sheets thus stacked.

19. A method as in claim 10, wherein said area is measured by a method selected from the group consisting of direct and indirect methods.

20. A method as in claim 1, further comprising the step of placing one of said internal electrodes in a shifted position to serve as an internal electrode for correction.

21. A method as in claim 10, further comprising the step of placing one of said internal electrodes in a shifted position to serve as an internal electrode for correction.

* * * * *

UNITED STATES PATENT AND TRADEMARK OFFICE
CERTIFICATE OF CORRECTION

PATENT NO. : 5,827,382
DATED : October 27, 1998
INVENTOR(S) : Mamoru Ogawa, et al.

It is certified that error appears in the above-identified patent and that said Letters Patent is hereby corrected as shown below:

Column 3, line 4, after "number" insert --A--.

Column 3, line 7, after "number" insert --A--.

Column 3, line 9, after "number" insert --A--.

Signed and Sealed this

Sixteenth Day of March, 1999

Attest:

Q. TODD DICKINSON

Attesting Officer

Acting Commissioner of Patents and Trademarks